United States Patent

[11] 3,583,551

| [72] | Inventor | Leonard S. Barnish<br>Johannesburg, Transvaal, Republic of South Africa |
|---|---|---|
| [21] | Appl. No. | 739,870 |
| [22] | Filed | June 25, 1968 |
| [45] | Patented | June 8, 1971 |
| [73] | Assignee | Hewitt-Robins-Denver(Proprietary) Limited<br>Johannesburg, Transvaal, Republic of South Africa |
| [32] | Priority | July 1, 1967 |
| [33] | | South Africa |
| [31] | | 67/2543 |

[54] SEALS FOR CONVEYORS SUPPORTED ON GAS CUSHIONS
4 Claims, 6 Drawing Figs.

[52] U.S. Cl. .................................................. 198/184,
198/204, 302/29
[51] Int. Cl. ........................................................ B65g 15/08,
B65g 15/60

[50] Field of Search........................................... 198/108,
184, 204; 302/29, 31

[56] References Cited
UNITED STATES PATENTS

| 756,600 | 4/1904 | Dodge........................ | 198/108 |
| 3,190,460 | 6/1965 | Rubin......................... | 302/2 UX |

FOREIGN PATENTS

| 964,482 | 5/1957 | Germany..................... | 198/184 |
| 641,621 | 5/1962 | Canada ...................... | 302/29 |

Primary Examiner—Harvey C. Hornsby
Assistant Examiner—W. Scott Carson
Attorney—Sughrue, Rothwell, Mion, Zinn & Macpeak ABSTRACT: A sealing arrangement for a conveyor belt of the kind which is supported on a cushion of air. The seal is of a nature that its effectiveness is a function of the air pressure developed to support the belt.

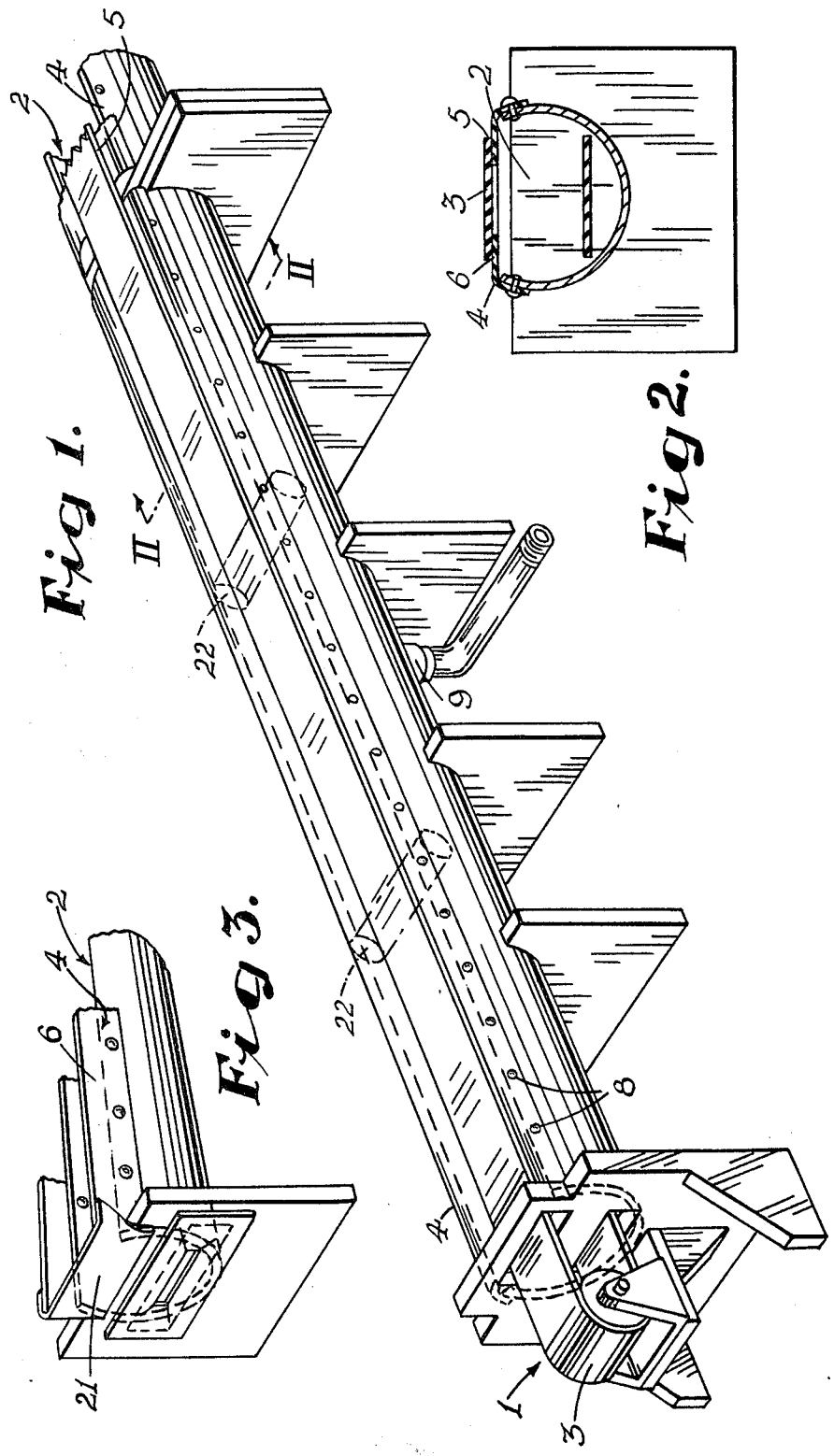

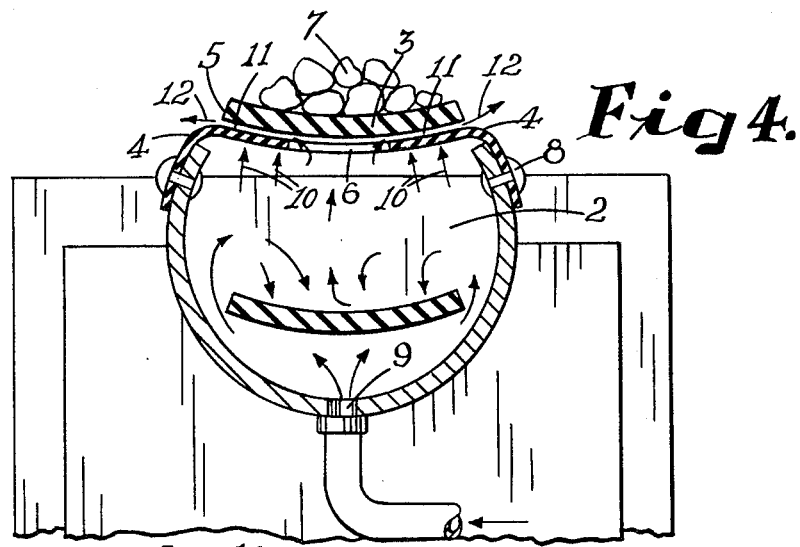
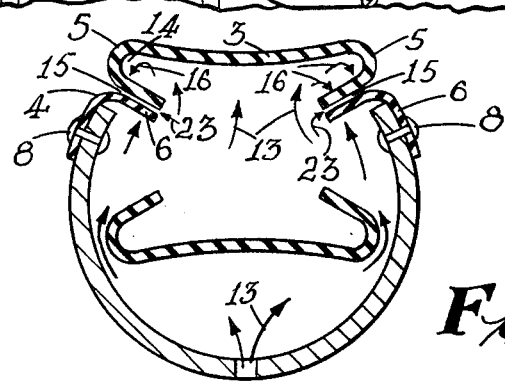
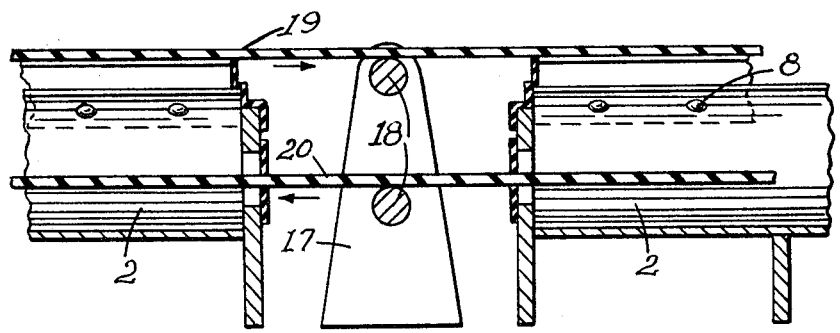

SEALS FOR CONVEYORS SUPPORTED ON GAS CUSHIONS

This invention relates to seals for use in endless type conveyors of the kind which are to be at least partially supported on cushions of gas, usually air cushions.

In a suggested form for such a conveyor the operative part of the conveyor belt is located above a trough in which the gas cushion is developed. This cushion serves to support the operative region of the belt over at least a portion of its length. Seals along the sides of the conveyor belt in the region of the tops of the trough walls are important aspects in the successful operation of such a conveyor system and the present invention seeks to provide a seal of a novel and useful character.

By the term "seal" the applicant means an arrangement which permits the leakage of air to an extent which allows the efficient movement of the belt over the support trough. It is obvious that some air should leak between the trough wall and the belt, but this leakage must be controlled by a seal which permits only that amount of air to leak which is sufficient to allow efficient belt movement. In this regard, therefore, the term "seal" is used in this specification in the light of the above explanation.

According to the invention a sealing arrangement for an endless belt conveyor which is at least partially supported on a cushion of gas developed within a trough underlying the belt is characterized in sections of the sidewalls of the trough and the sides of the belt which mate to form lip seals the effectiveness of which is a function of the gas pressure within the trough is formed with inwardly curving sidewall top zones and the belt is intended to rest on the summits of these curved regions, the curved regions being of resiliently flexible material.

In a preferred form of the invention flaps of rubber or rubberlike material are anchored to the trough sidewalls and these flaps are bent inwardly by the belt load imposed upon them.

In a further preferred form of the invention the sides of the belt include downwardly and inwardly directed channel formations adapted to ride above the tops of the trough sidewalls which are bent inwardly at least during operative periods of the belt.

The invention also includes within its scope a conveyor arrangement employing the above sealing arrangements.

In order to illustrate the invention some examples are described below, in which:

FIG. 1 is a perspective view of a conveyor system in accordance with the invention, FIG. 2 is a sectional view along lines II-II of the conveyor system showing the belt unloaded.

FIG. 3 is a part perspective view of the trough of the conveyor system without a belt in position, FIG. 4 is a sectional view of the conveyor system showing the belt loaded and the operation of the sealing arrangement, FIG. 5 is a sectional view of a trough and belt of the conveyor system, the sealing arrangement of a second kind in accordance with the invention, and FIG. 6 is a sectional side view of the conveyor system showing a belt passing between two troughs of the system disposed in end to end relationship.

A sealing arrangement for an endless belt conveyor 1 which is supported on a cushion of gas developed in a trough 2 underlying the belt 3 is arranged so that the sidewalls of the trough 2 mate with the sides 5 of the belt to form lip-type seals. The arrangement is such that as the gas pressure increases within defined limits so the sealing effect of the lip seals is enhanced. Obviously, if the pressure increases beyond an operational level the sealing effect will be lessened. This operational level will be determined by, among other factors, the load on the belt 3 and the kind of material forming the belt.

The trough 2 is formed with inwardly curving sidewall top zones and the belt 3 rests on the summits of these curved zones, which are formed of a resiliently flexible material. The zones are constituted by flaps 6 of rubber of rubberlike material which are bent inwardly by the belt load 7 imposed on them. Suitable anchoring means 8 secures the flaps 6 to the walls of the trough 2.

Referring to FIG. 4 air which is pumped into the trough 2 through the inlet 9 moves in the trough 2 as shown by arrows 10. As the pressure on the underside of the flaps increases the belt 3 is lifted from its resting position. With increase of pressure seal 11 will become tighter as the flaps 6 are urged upwardly and outwardly. Should the pressure be raised further a point will be reached where the pressure becomes too great and the seal 11 breaks. Even in the operational zone of pressure the seal 11 may or may not be completely airtight: but this should not adversely affect the operation of the belt 3. When the seal 11 is not completely airtight leaking will occur as indicated by arrows 12.

FIG. 5, where a second embodiment of the invention is illustrated, air enters the trough 2 and moves therein as indicated by arrows 13. Here the belt 3 is provided at its sides 5 with inwardly and downwardly directed channel formations 14 which ride above the flaps 6 of the trough sidewalls 4. The flap zones 6 cooperate with the channel formations 14 to form the required lip seal 15. As the arrows 16 indicate pressure in the channel, formations 14 act to urge the seal 15 closed, and in this way a double kind of action causes a sealing of the lip. In this drawing arrows 23 indicate air leakage from the seal.

Considering the conveyor system 1 generally, FIG. 6 shows the manner in which a belt 3 passes from one section of the system to another, the trough zones 2 being disposed in end-to-end relationship. A pedestal 17 located between two troughs 2 has suitable roller bearings 18 which support the forward moving belt position 19 and returning position 20.

In FIG. 3 the manner in which the end wall 21 of the trough 2 is connected to the flap zones 6 is shown. This end wall 21 is also of a resiliently flexible material and it is bent inwardly by a belt 3 which is located on the conveyor system 1. Bearings 22 provide support to the belt 3 when the air pressure is insufficient to raise the belt 3.

Many more examples of the invention exist each differing from the other in matters of detail only. For instance in the arrangement where a belt 3 with channel formations 14 is used it may be unnecessary to provide flexible flap regions 6. These regions may be of rigid material and the pressure as indicated by arrows 16 may be sufficient to develop the lip seal 15.

I claim:

1. In a sealing arrangement for a conveyor system including an endless conveyor belt, a trough of substantially rigid construction disposed parallel to the longitudinal axis of the conveyor belt and directly underlying same, and means for supplying gas under pressure to the trough for at least partially supporting the conveyor belt, the improvement comprising: inwardly curving sidewall top zones for the trough of resiliently flexible material, the sidewall top zones having inwardly projecting, opposing ends that are spaced apart from each other at all times, the sidewall top zones being adapted to support the portions of the conveyor belt near the edges thereof and form lip seals therewith, the effectiveness of which is a function of the gas pressure within the trough.

2. The sealing arrangement claimed in claim 1 wherein the inwardly curving sidewall top zones are flaps of rubberlike like material anchored to the trough sidewalls and bent inwardly when a load is imposed upon them by the conveyor belt.

3. The sealing arrangement claimed in claim 1 wherein the portions of the conveyor belt near the edges thereof are bent downwardly and inwardly to form channels adapted to rest upon the summits of the inwardly curving sidewall top zones.

4. In a conveyor system including an endless conveyor belt, a contrained trough underlying the belt, and means for supplying a supporting cushion of gas to the trough, an improved sealing arrangement comprising: resiliently flexible top zones on the sidewalls of the trough having inwardly projecting, opposing ends that are spaced apart from each other at all times, the top zones on said sidewalls being adapted, when bent downwardly, to mate with adjacent edges of the belt to form lip seals therewith.